(12) United States Patent
Goodjohn

(10) Patent No.: US 7,869,801 B2
(45) Date of Patent: Jan. 11, 2011

(54) METHOD FOR TERMINAL CONFIGURATION OVER A RADIO CONTROL CHANNEL

(75) Inventor: Paul Goodjohn, Lynchburg, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 253 days.

(21) Appl. No.: 11/550,689

(22) Filed: Oct. 18, 2006

(65) Prior Publication Data

US 2008/0095103 A1 Apr. 24, 2008

(51) Int. Cl.
*H04Q 7/00* (2006.01)

(52) U.S. Cl. ............... 455/419; 455/434; 455/418

(58) Field of Classification Search ........... 455/419, 455/68, 70, 418, 458, 500, 503, 517, 434; 370/329
See application file for complete search history.

(56) References Cited

U.S. PATENT DOCUMENTS

| | | | |
|---|---|---|---|
| 5,666,293 A | 9/1997 | Metz et al. | |
| 5,768,539 A | 6/1998 | Metz et al. | |
| 6,023,620 A | 2/2000 | Hansson | |
| 6,088,457 A * | 7/2000 | Parkinson et al. | 380/270 |
| 6,456,843 B1 | 9/2002 | Daly | |
| 6,643,506 B1 * | 11/2003 | Criss et al. | 455/419 |
| 6,885,862 B1 * | 4/2005 | Pearson | 455/419 |
| 6,912,256 B1 | 6/2005 | Noblet | |
| 6,937,877 B2 | 8/2005 | Davenport | |
| 7,023,834 B1 | 4/2006 | Radimirsch | |
| 7,653,680 B2 * | 1/2010 | Itaba et al. | 709/201 |

\* cited by examiner

*Primary Examiner*—Dwayne D Bost
*Assistant Examiner*—Myron Wyche
(74) *Attorney, Agent, or Firm*—Allen, Dyer, Doppelt, Milbrath & Gilchrist, P.A.

(57) ABSTRACT

An embodiment is a method for configuring a terminal (e.g., a radio) over a radio control channel. Instead of requiring on-site technicians to physically connect to the radios or error-prone and time consuming data calls to individual radios, an embodiment broadcasts software and configuration data as part of one or more radio control channel messages. As the radio control message or multiple messages are broadcast, any radio listening to the radio control message(s) may be configured. Additionally, radios of a particular type will be configured to use the same version of software and configuration data.

24 Claims, 5 Drawing Sheets

METHOD FOR TERMINAL CONFIGURATION OVER A RADIO CONTROL CHANNEL

BACKGROUND

Modern wireless communication systems may operate both in analog and digital modes in frequency ranges allocated according to the Federal Communications Commissions (FCC). In particular, a digital wireless communications system may operate according to Institute of Electrical and Electronics Engineers (IEEE) standards such as the 802.11 standards for Wireless Local Area Networks (WLANs) and the 802.16 standards for Wireless Metropolitan Area Networks (WMANs). Worldwide Interoperability for Microwave Access (WiMAX) is a wireless broadband technology based on the IEEE 802.16 standard of which IEEE 802.16-2004 and the 802.16e amendment are Physical (PHY) layer specifications.

Wireless communications systems, for example those operating to the IEEE 802.11 and 802.16 standards, may share frequency ranges allocated by the FCC. Further, Land Mobile Radio may operate in another allocated frequency range. Further still, cellular telephones and other cellular devices may operate according to any number of cellular telephone or cellular device standards.

SUMMARY

One embodiment may comprise a communications system comprising a communications medium and one or more radios coupled to the communications medium. The radios may be arranged to receive from a transmitter over a broadcast channel a control channel message including chunk data, the chunk data including at least a portion of software and configuration data for the radios. A determination may be made by each radio whether the chunk data corresponds to its radio type.

One embodiment may comprise a communications system including an antenna and a transmitter coupled to the antenna. The transmitter may be arranged to broadcast a control channel message including chunk data, the chunk data including at least a portion of software or configuration data.

One embodiment may comprise a technique for receiving, by a radio having a radio type, a control channel message including chunk data, the chunk data including at least a portion of software or configuration data for the radio. The technique may determine, by the radio, whether the chunk data corresponds to the radio type.

One embodiment may comprise an article comprising a machine-readable storage medium containing instructions that if executed enable a communications system to receive, by a radio coupled to the communications system, the radio having a radio type, a control channel message including chunk data, the chunk data including at least a portion of software and configuration data for the radio, and determine, by the radio, whether the chunk data corresponds to the radio type.

DETAILED DESCRIPTION

Figure 1:
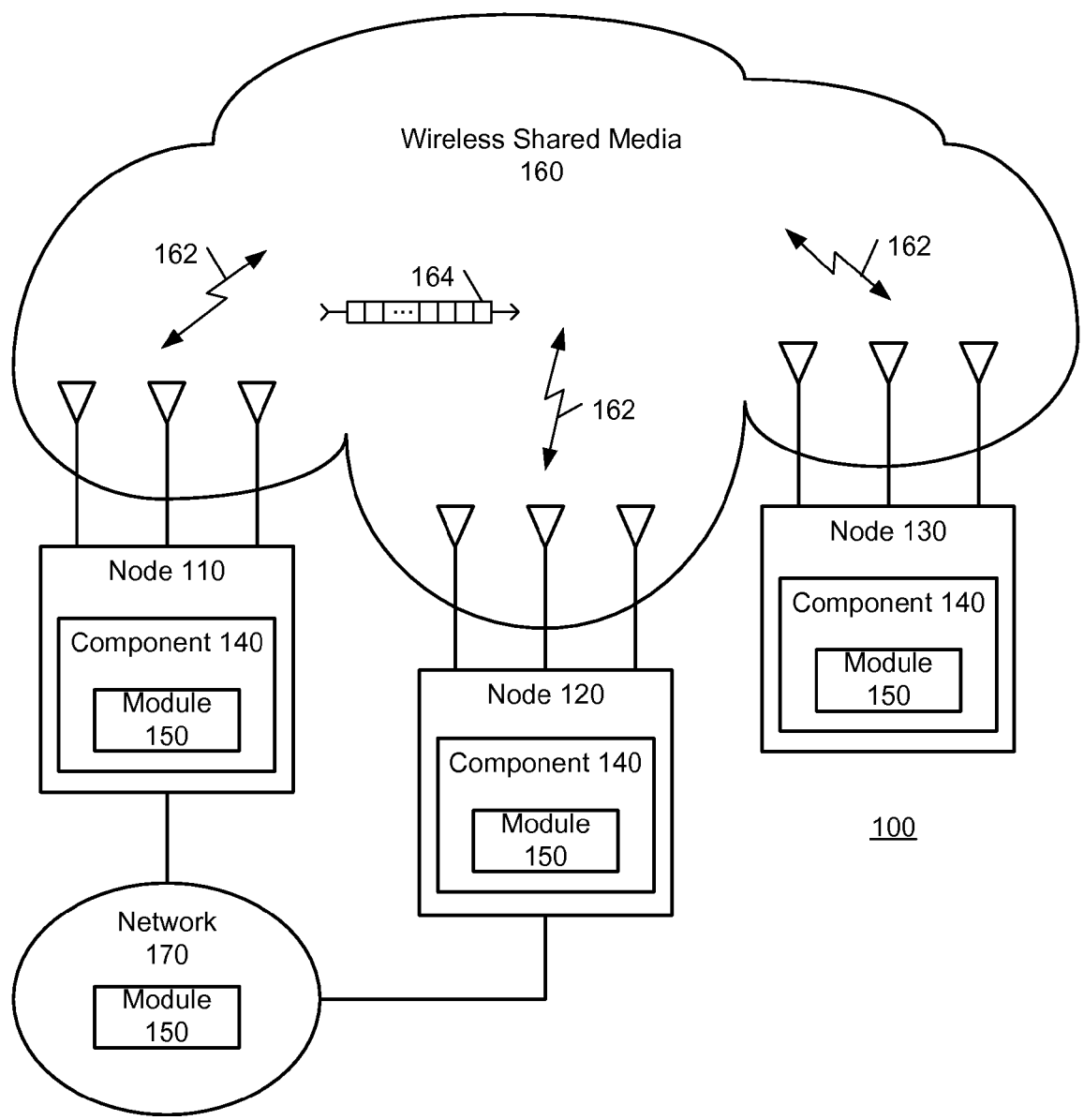
FIG. 1 is a schematic diagram of a wireless system, according to the present invention.

Land mobile radio refers to a radio operating according to APCO, Telecommunications Industry Association (TIA), or other similar land mobile radio standard. The APCO standards, for example, were established to address the need for common digital public safety radio communications standards for First Responders and Homeland Security/Emergency Response professionals (e.g., police, paramedic, fire, military, or any other state or federal emergency response organizations). In an embodiment, land mobile radio is allocated numerous frequency ranges commonly within the 100-900 MHz range, though other frequency ranges may also be allocated.

A land mobile radio may contain software and other configuration data. In an embodiment, the software and configuration data may collectively require hundreds of kilobytes of memory or more. For example, software and configuration data may include program code or values for radio software, radio configuration parameters, radio calibration, encryption, or any other soft information that may be used by the land mobile radio. Currently, updating or otherwise altering the software and configuration data may require that the land mobile radio be connected to equipment provided by installation and maintenance providers via an assortment of cables, adapters, or the like specific to the land mobile radio manufacturer, model, and so on. Further, the land mobile radio may be individually programmed with data call information. However, for each approach, the time, human, and equipment resources required to maintain a land mobile radio of an embodiment may substantially limit the ease with which multiple land mobile radios may be programmed and configured.

Various embodiments may be generally directed to techniques for programming and/or configuring multiple land mobile radios with a broadcast signal. In one embodiment, for example, a communications system may comprise a communications medium and one or more radios coupled to the communications medium. The radios may be arranged to receive a control channel message including chunk data from a transmitter over a broadcast channel. The chunk data may include at least a portion of software and configuration data for the radios. Each radio may determine whether the chunk data corresponds to its radio type. Other embodiments are described and claimed.

The method of an embodiment may provide a manner by which multiple land mobile radios may be programmed and configured with a broadcast signal simultaneously. In particular, the land mobile radios may be programmed and configured with a control channel message or messages. In an embodiment, at least a control channel message may include information representing the software and configuration data introduced above. More specifically, in an embodiment individual control channel messages may include at least a portion, or chunk, of the total information required for the software and configuration data. The portions or chunks of the software and configuration data may then be assembled or combined by the land mobile radios to recover the software and configuration data. The land mobile radios may thereafter load, install, or otherwise implement the received software and configuration data.

Embodiments of a method for terminal configuration over a radio control channel will be described. Reference will now be made in detail to a description of these embodiments as illustrated in the drawings. While the embodiments will be described in connection with these drawings, there is no intent to limit them to drawings disclosed herein. On the contrary, the intent is to cover all alternatives, modifications, and equivalents within the spirit and scope of the described embodiments as defined by the accompanying claims.

One embodiment is a method for configuring a terminal (e.g., a radio) over a radio control channel during normal operation. Instead of requiring on-site technicians to physically connect to the radios or error-prone and time consuming data calls to individual radios, an embodiment broadcasts software and configuration data as part of one or more radio control channel messages. More specifically, in an embodiment the software and configuration data, depending on its total size, may be divided into chunks that may each form part of a radio control channel message. Thereafter, the chunk or chunks contained in one or many radio control channel messages respectively are broadcast to the radios on the radio system. Based on additional information contained within the radio control message, any particular radio may determine if the software and configuration data is intended for a radio of its type. Depending on that determination, the radio may accumulate chunks of data sufficient to reconstruct the software and configuration data. As the radio control message or multiple messages (e.g., for multiple chunks and/or multiple radio types) are broadcast, any radio listening to the radio control message(s) may be configured. Additionally, radios of a particular type will be configured to use the same version of software and configuration data.

FIG. 1 illustrates an embodiment of a system. FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a programmable device such as a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

The nodes of the communications system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various implementations, the nodes of the communications system 100 may be arranged to segment a set of media information and control information into a series of packets. A packet generally may comprise a discrete data set having fixed or varying lengths, and may be represented in terms of bits or bytes. It can be appreciated that the described embodiments are applicable to any type of communication content or format, such as packets, cells, frames, fragments, units, and so forth.

The communications system 100 may communicate information in accordance with one or more standards, such as standards promulgated by the IEEE, the Internet Engineering Task Force (IETF), the International Telecommunications Union (ITU), and so forth. In various embodiments, for example, the communications system 100 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs. The communications system 100 may communicate information according to one or more of the Digital Video Broadcasting Terrestrial (DVB-T) broadcasting standard and the High performance radio Local Area Network (HiperLAN) standard. The communications system 100 may further communicate information according to standards for land mobile radio as promulgated by the Association of Public Safety Communications Officials (APCO) or any other land mobile radio standards. The embodiments are not limited in this context.

In various embodiments, the communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The communications system 100 may include one or more nodes (e.g., nodes 110-130) arranged to communicate information over one or more wired and/or wireless communications media. Examples of wired communications media may include a wire, cable, printed circuit board (PCB), backplane, switch fabric, semiconductor material, twisted-pair wire, coaxial cable, fiber optics, and so forth. An example of a wireless communication media may include portions of a wireless spectrum, such as the radio-frequency (RF) spectrum. In such implementations, the nodes of the system 100 may include components and interfaces suitable for communicating information signals over the designated wireless spectrum, such as one or more transmitters, receivers, transceivers, amplifiers, filters, control logic, antennas and so forth.

The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth.

In various embodiments, the communications system 100 may comprise or form part of a network, such as a WiMAX network, a broadband wireless access (BWA) network, a WLAN, a WMAN, a wireless wide area network (WWAN), a wireless personal area network (WPAN), a Code Division Multiple Access (CDMA) network, a Wide-band CDMA (WCDMA) network, a Time Division Synchronous CDMA (TD-SCDMA) network, a Time Division Multiple Access (TDMA) network, an Extended-TDMA (E-TDMA) network, a Global System for Mobile Communications (GSM) network, an Orthogonal Frequency Division Multiplexing (OFDM) network, an Orthogonal Frequency Division Multiple Access (OFDMA) network, a North American Digital Cellular (NADC) network, a Universal Mobile Telephone System (UMTS) network, a third generation (3G) network, a fourth generation (4G) network, a local area network (LAN), a wide area network (WAN), a metropolitan area network (MAN), the Internet, the World Wide Web, a cellular network, a radio network, a satellite network, and/or any other communications network configured to carry data. The embodiments are not limited in this context.

The communications system 100 may employ various modulation techniques including, for example: OFDM modulation, Quadrature Amplitude Modulation (QAM), N-state QAM (N-QAM) such as 16-QAM (four bits per symbol), 32-QAM (five bits per symbol), 64-QAM (six bits per symbol), 128-QAM (seven bits per symbol), and 256-QAM (eight bits per symbol), Differential QAM (DQAM), Binary Phase Shift Keying (BPSK) modulation, Quadrature Phase Shift Keying (QPSK) modulation, Offset QPSK (OQPSK) modulation, Differential QPSK (DQPSK), Frequency Shift Keying (FSK) modulation, Minimum Shift Keying (MSK) modulation, Gaussian MSK (GMSK) modulation, and so forth. The embodiments are not limited in this context.

In various embodiments, the communications system 100 may be arranged to receive a signal. More specifically, the communications system 100 may be arranged to receive a desired signal while substantially blocking an unwanted signal. For example, within a range of signal frequencies, the communications system 100 may be exposed to any number of signal frequencies and signal powers. The communications system 100 may select a desired frequency or frequency range to properly receive a desired signal. To do so, the communications system 100 may have to be sensitive to signal frequencies in that particular range. However, the communications system 100 may further be overloaded by unwanted signals based on their power and/or their frequency proximity to the frequency of the desired signal. The communications system 100 of an embodiment may employ a receiver including variable attenuation that may be controlled by detecting the power of incident signal frequencies to substantially maintain sensitivity of the communications system 100 to the desired signal while simultaneously protecting the communications system 100 from overload caused by unwanted signals. In an embodiment, the communications system 100 may protect against overload while not substantially degrading its sensitivity to the desired signal relative to a communications system that does not include a receiver with variable attenuation.

In one embodiment, communications system 100 may include one or more wireless communication devices, such as nodes 110-130. Nodes 110-130 all may be arranged to communicate information signals using one or more wireless transmitters/receivers ("transceivers") or radios, which may involve the use of radio frequency communication via 802.16 schemes (e.g., 802.16-2004, 802.16.2-2004, 802.16e, 802.16f, and variants) for WMANs, land mobile radio schemes, or cellular telephone and device schemes, for example. Nodes 110-130 may communicate using the radios over wireless shared media 160 via multiple inks or channels established therein. Although FIG. 1 is shown with a limited number of nodes in a certain topology, it may be appreciated that communications system 100 may include additional or fewer nodes in any type of topology as desired for a given implementation. The embodiments are not limited in this context.

Further, nodes 110 and 120 may comprise fixed devices having wireless capabilities. A fixed device may comprise a generalized equipment set providing connectivity, management, and control of another device, such as mobile devices. Examples for nodes 110 and 120 may include a wireless access point (AP), base station or node B, router, switch, hub, gateway, media gateway, and so forth. In an embodiment, nodes 110 and 120 may also provide access to a network 170 via wired communications media. Network 170 may comprise, for example, a packet network such as the Internet, a corporate or enterprise network, a voice network such as the Public Switched Telephone Network (PSTN), among other WANs, for example. The embodiments are not limited in this context.

In one embodiment, system 100 may include node 130. Node 130 may comprise, for example, a mobile device or a fixed device having wireless capabilities. A mobile device may comprise a generalized equipment set providing connectivity to other wireless devices, such as other mobile devices or fixed devices. Examples for node 130 may include a computer, server, workstation, notebook computer, handheld computer, telephone, cellular telephone, personal digital assistant (PDA), combination cellular telephone and PDA, land mobile radio, and so forth.

Nodes 110-130 may have one or more wireless transceivers and wireless antennas. In one embodiment, for example, nodes 110-130 may each have multiple transceivers and multiple antennas to communicate information signals over wireless shared media 160. For example, a channel 162, link, or connection may be formed using one or more frequency bands of wireless shared medium 160 for transmitting and receiving packets 164. The embodiments are not limited in this context.

Figure 2:
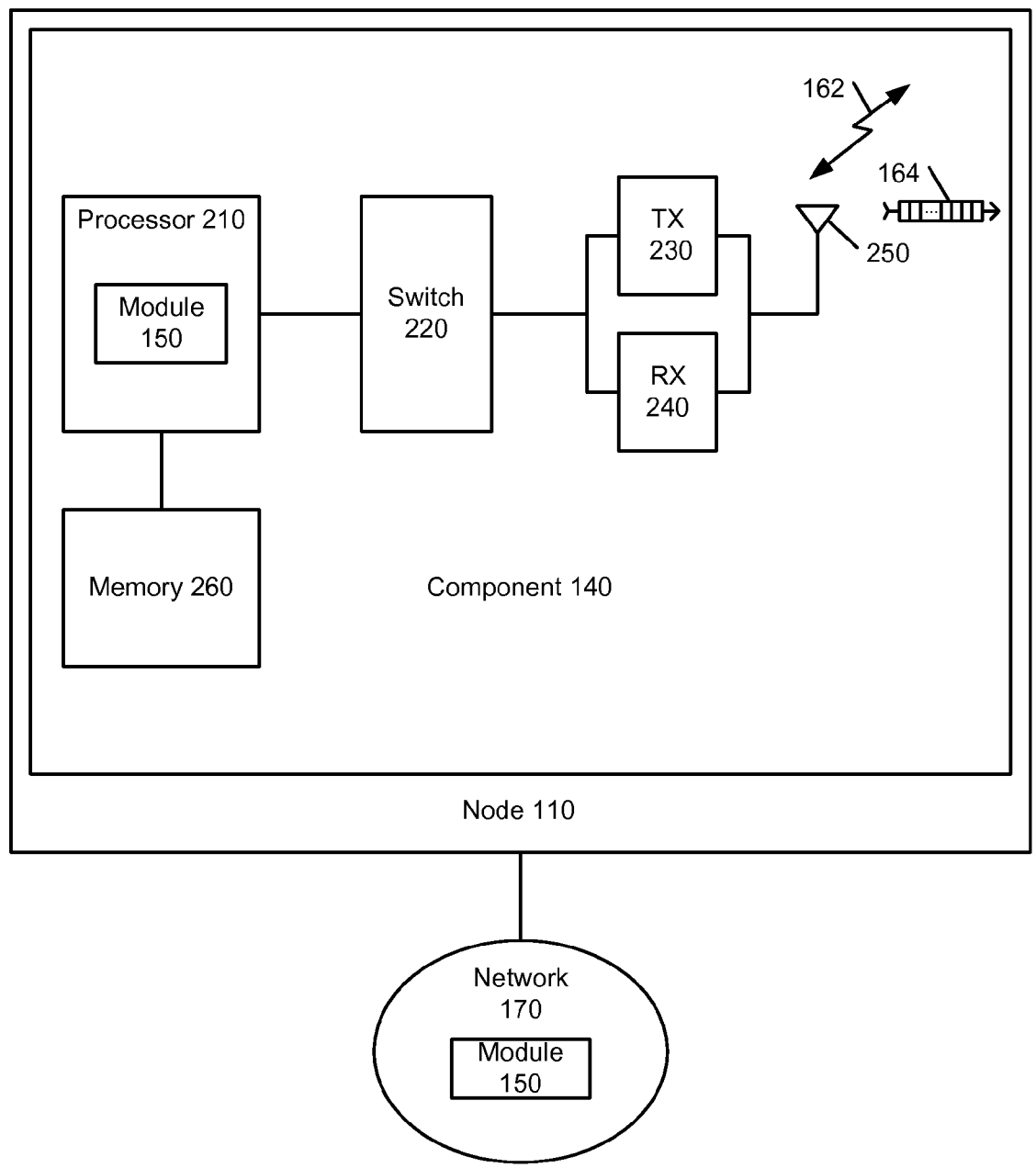
FIG. 2 is a schematic diagram of a wireless system node in the wireless system of FIG. 1.

FIG. 2 more specifically illustrates node 110 of the communications system 100. As shown in FIG. 2, the node may comprise multiple elements such as a component 140, a module 150, a processor 210, a memory 260, a switch 220, a transmitter 230, a receiver 240, and an antenna 250 to communicate packets 164 over wireless shared media 160. A module may refer to any physical or logical element directed to a specific set of operations that may be implemented using hardware, software or a combination of both. Transmitter 230 and receiver 240 may also be collectively referred to as a transceiver. Antenna 250 may include an internal antenna, an omni-directional antenna, a monopole antenna, a dipole antenna, an end fed antenna or a circularly polarized antenna, a micro-strip antenna, a diversity antenna, a dual antenna, an antenna array, and so forth. Some elements may be implemented using, for example, one or more circuits, components, registers, processors, software subroutines, or any combination thereof. Although FIG. 2 shows a limited number of elements, it can be appreciated that additional or fewer elements may be used in node 110 as desired for a given implementation. The embodiments are not limited in this context.

As noted, in an embodiment, node 110 may include a processor 210. Processor 210 may be connected to switch 220 and/or the transceiver (i.e., transmitter 230 and receiver 240). Processor 210 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In an embodiment, for example, processor 210 may be implemented as a general purpose processor. Processor 210 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments are not limited in this context.

In one embodiment, processor 210 may include, or have access to, memory 260. Memory 260 may comprise any machine-readable media. Memory 260 may be implemented using any machine-readable or computer-readable media capable of storing data, including both volatile and non-volatile memory. For example, memory 260 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 260 may be included on the same integrated circuit as processor 210, or alternatively some portion or all of memory 260 may be disposed on an integrated circuit or other medium, for example a hard disk drive, that is external to the integrated circuit of processor 210. The embodiments are not limited in this context.

When implemented in a node of communications system 100, node 110 may be arranged to communicate information over wireless communications media between the various nodes, such as nodes 120 and 130. The information may be communicated using in the form of packets 164 over wireless shared media 160, with each packet 164 comprising media information and/or control information. The media and/or control information may be represented using, for example, multiple Orthogonal Frequency Division Multiplexing (OFDM) symbols. A packet 164 in this context may refer to any discrete set of information, including a unit, frame, cell, segment, fragment, and so forth. The packet may be of any size suitable for a given implementation. The embodiments are not limited in this context.

Figure 3:
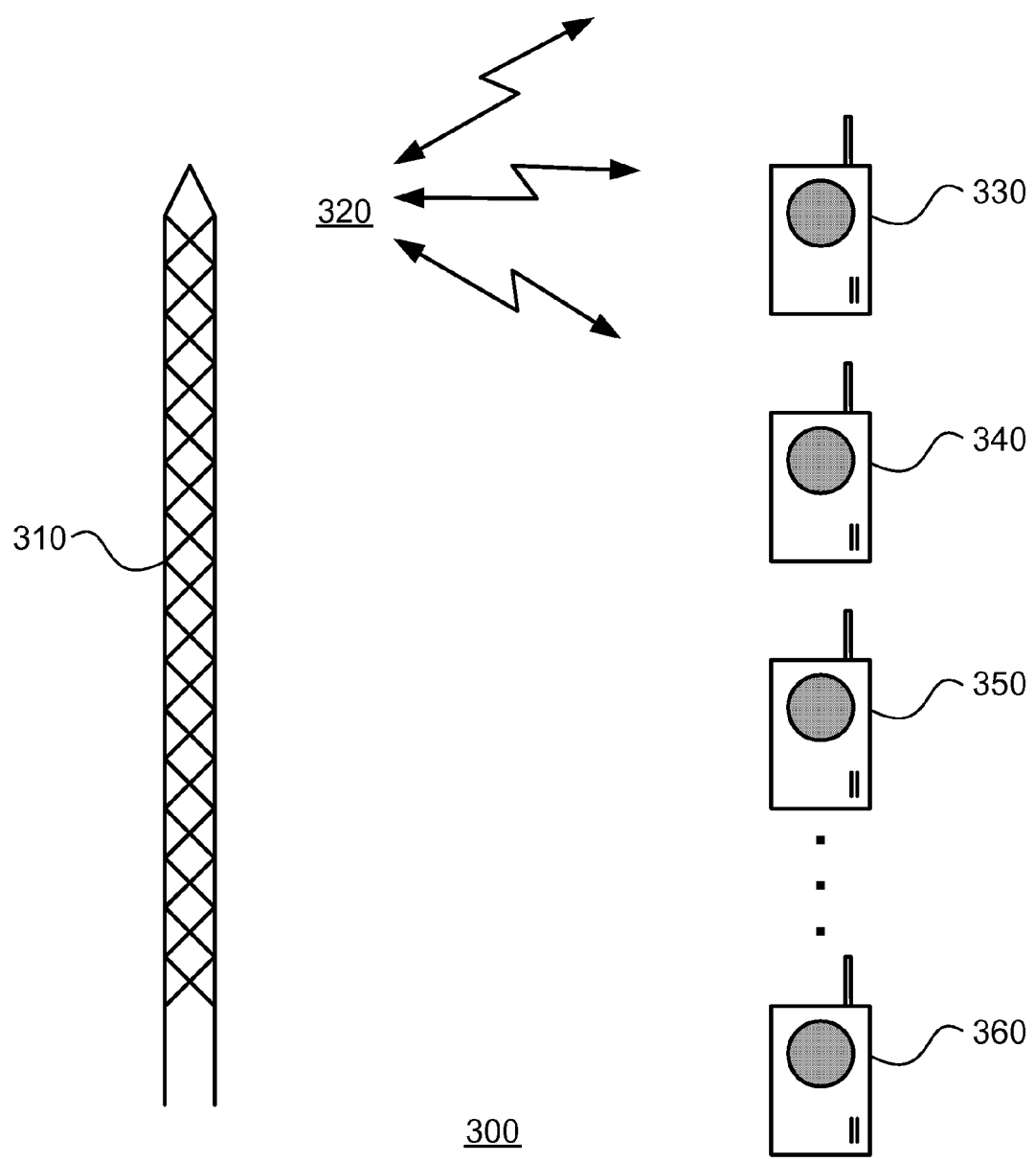
FIG. 3 illustrates a mobile radio system, according to the present invention.
Figure 4:
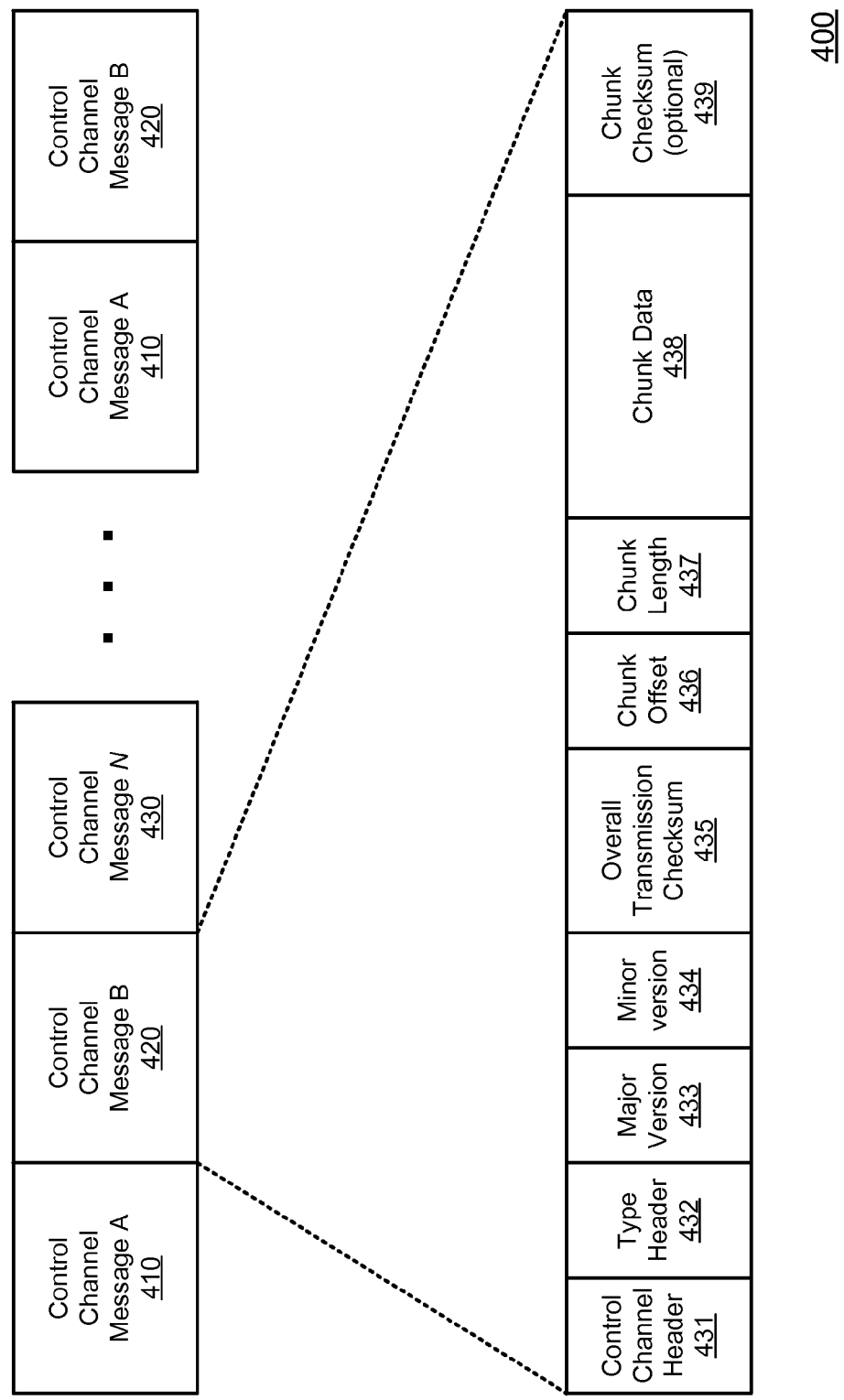
FIG. 4 is a schematic diagram of a control channel structure, according to the present invention.
Figure 5:
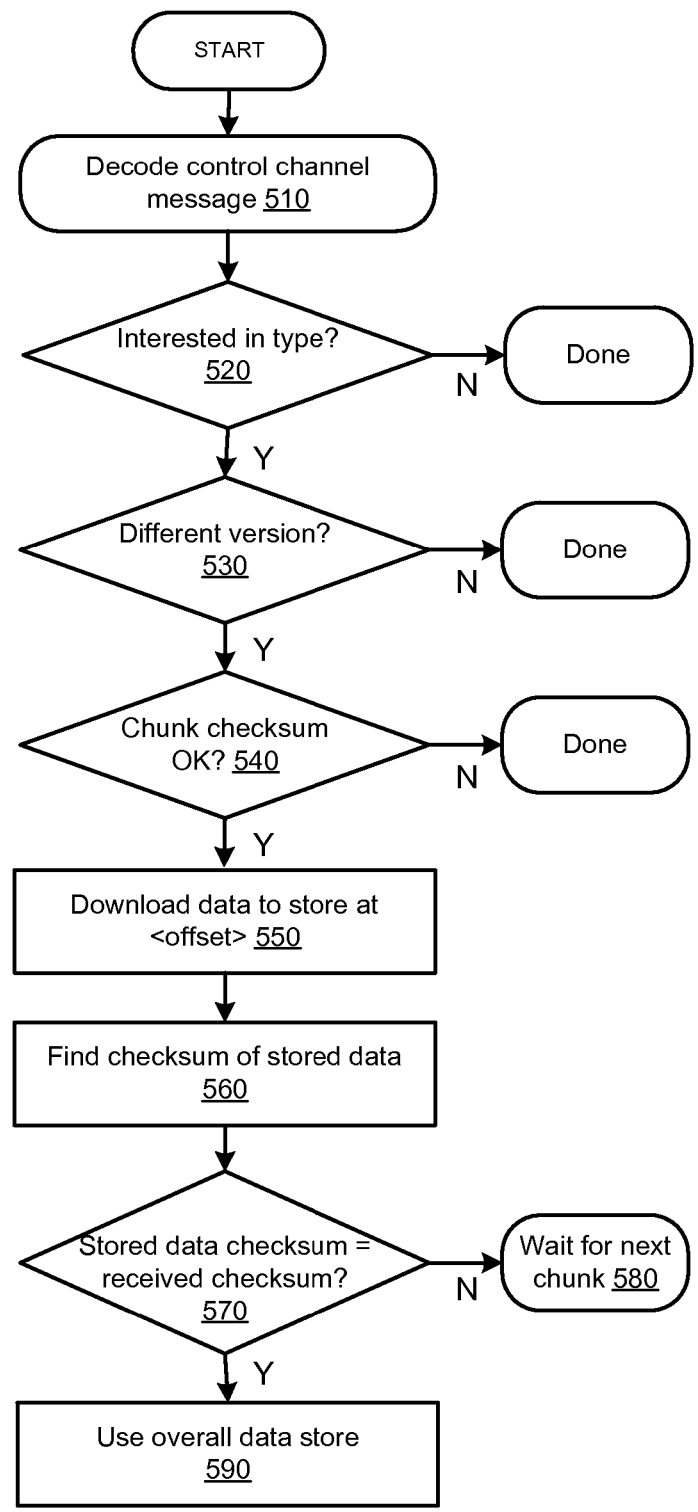
FIG. 5 is a flowchart illustrating operation of the wireless system of FIG. 1.

FIG. 3 through FIG. 5 more specifically describe, for example, the transmitter 230 of the communications system 100 and/or node 110 and method of operation thereof. In particular, FIG. 3 through FIG. 5 describe the transmitter 230 of an embodiment as part of a land mobile radio system. As introduced, land mobile radio refers to a radio operating according to APCO, Telecommunications Industry Association (TIA), or other similar land mobile radio standard. The APCO standards, for example, were established to address the need for common digital public safety radio communications standards for First Responders and Homeland Security/Emergency Response professionals (e.g., police, paramedic, fire, military, or any other state or federal emergency response organizations). In an embodiment, land mobile radio is allocated numerous frequency ranges commonly within the 100-900 MHz range, though other frequency ranges may also be allocated.

For example, FIG. 3 illustrates a land mobile radio system 300 of an embodiment including antenna 310 that may be coupled to transmitter 230. As illustrated, the transmitter 230, through antenna 310, would transmit a broadcast signal 320 to any number of devices receptive to the broadcast signal. For example, the transmitter 230, through antenna 310, may transmit a broadcast signal 320 to any number of land mobile radios 330-360.

Each of the land mobile radios 330-360 may contain software and other configuration data. In an embodiment, the software and configuration data may collectively require hundreds of kilobytes of memory or more. For example, software and configuration data may include code or values for radio software, radio parameters, radio calibration, encryption, or any other software information that may be used by the land mobile radios 330-360.

Currently, updating or otherwise altering the software and configuration data may require that the land mobile radios 330-360 be individually connected to equipment provided by installation and maintenance providers via an assortment of cables, adapters, or the like specific to the land mobile radio 330-360 manufacturer, model, and so on. Further, the land mobile radios 330-360 may be individually programmed with data call information over the land mobile radio system 300. However, for each approach, the time, human, and equipment resources required to maintain such a land mobile radio system 300 of an embodiment may substantially limit the ease with which the land mobile radios 330-360 of land mobile radio system 300 may be programmed and configured.

The method of an embodiment may provide a manner by which land mobile radios 330-360 may be programmed and configured with broadcast signal 320. FIG. 4, for example, illustrates a portion of broadcast signal 320. More specifically, FIG. 4 illustrates a stream 400 of control channel messages 410-430 contained in the broadcast signal 320. In an embodiment, control channel message A 410 is followed by control channel message B 420 and so on to control channel message N 430. Thereafter, the control channel messages 410-430 are repeated. The land mobile radios 330-360, as part of the land mobile radio system 300, may consistently listen to the stream 400 and receive the control channel messages 410-430 contained therein. In an embodiment, at least a control channel message (as illustrated, control channel message B 420) may include information representing the software and configuration data introduced above. More specifically, in an embodiment individual control channel messages may include at least a portion, or chunk, of the total information required for the software and configuration data. The portions or chunks of the software and configuration data may then be assembled or combined by the land mobile radios 330-360 to recover the software and configuration data. The land mobile radios 330-360 may thereafter load, install, or otherwise implement the received software and configuration data.

In various embodiments, the land mobile radios 330-360 may be arranged to perform programming and configuration operations while operating in an idle mode, active mode or both. An idle mode may refer to an operating mode where a land mobile radio is powered on but a user is not utilizing the powered land mobile radio for voice (e.g., telephone call) or data communications (e.g., web browsing). An active mode may refer to an operating mode where a land mobile radio is powered on but a user is utilizing the powered land mobile radio for voice and/or data communications. For efficiency purposes, it may be desirable to perform the programming and configuration operations while in an idle mode to ensure voice and/or data communications performance is not impacted. When implemented as a digital land mobile radio, however, the programming and configuration operations may also be performed during voice and/or data communications sessions. The latter case may be appropriate or desirable, for example, for higher bandwidth channels, lower signal-to-noise-ratio (SNR) requirements, time constraints, lower traffic load conditions, lower priority communication traffic, and so forth. The embodiments are not limited in this context.

More specifically, FIG. 4 illustrates an exploded view of control channel message B 420 that includes, among other portions, the chunk of software and configuration data 438 introduced above. As noted, in an embodiment the software code and configuration data load for a particular land mobile radio may be divided into chunks, each of which may include information as to where the chunk resides as part of the whole software and configuration data and a mechanism for verifying that the whole data transmission has been received.

For example, the control channel message B 420 may include a control channel header 431 that may be necessary overhead to fit the appended data into the regular control channel signaling of the land mobile radio system 300. The type header 432 may include a numeric code indicating the type of radio to which the chunk data 438 may apply. For example, there may be a variety of types of land mobile radios for a given land mobile radio 300 system. While control message B 420 may be for a particular type of radio, software and configuration data may be carried by, for example, control channel message A 410 for another type of radio. Accordingly, based on the type header 432, the land mobile radios 330-360 would be able to determine whether or not the corresponding chunk data 438 was meant for them. Similarly, the indications of major version 433 and minor version 434 may further distinguish the chunk data 438 and the software and configuration data of which it is part so that land mobile radios 330-360 of the same type would again know if the chunk data 438 were meant for them. Major version 433 and minor version 434 may be any defined values useful in differentiating between land mobile radios and/or software loads (e.g., software versions). For example, major software revisions may be indicated via the appropriate values communicated by major version field 433, while minor software revisions may be indicated using the appropriate values communicated by minor version field 434. The embodiments are not limited in this context.

The overall transmission checksum 435 represents the checksum for the entire software and configuration data transmission that, in an embodiment, may be comprised of multiple chunks (e.g., chunk data 438). As will be explained more fully below, a particular land mobile radio may receive multiple chunks over the course of hours or days as the land mobile radio system 300 cycles through multiple chunks for the same land mobile radio type as well as multiple chunks for other radio types. When the checksum of the received chunk data (e.g., chunk data 438 and related chunk data not illustrated) matches the overall transmission checksum 435, the individual land mobile radio will have an indication that it has received all of the chunks that represent the software and configuration data.

The chunk offset 436 and chunk length 437 portions of the control channel message B 420 indicate the location of the chunk data 438 in the whole of the software and configuration data. As noted, the software and configuration data may be comprised of multiple chunks that are transmitted separately as part of control channel messages. Further, depending on when a land mobile radio may begin listening to the stream 400 of control channel messages or other factors, it may receive chunk data out of order with respect to their location in the software and configuration data. Accordingly, the chunk offset 436 and the chunk length 437 may both serve to locate the chunk data 438 within the message and/or within the software and configuration data. More particularly, the chunk offset 436 and the chunk length 437 may be used to append, insert, replace, modify or otherwise position the chunk data 438 within the appropriate position or structure of the previously received software and configure data stored by the land mobile radio. For example, the chunk offset 436 and/or chunk length 437 may be used to store the chunk data at a location specified by the chunk offset 436, the chunk offset 436 to specify the location of the chunk data 438 within the software and configuration data. The embodiments are not limited in this context.

The chunk data 438 represents at least a portion of the software and configuration data that may be combined with other chunk data similarly organized and transmitted to recover the entire software and configuration data. As introduced, the software and configuration data may include code or values for radio software, radio parameters, radio calibration, encryption, or any other soft information that may be used by the land mobile radios 330-360. In an embodiment, the chunk data is followed by chunk checksum 439. In an embodiment, the chunk checksum is omitted, as the control channel protocol also provides a checksum to determine the accuracy of the control channel message.

FIG. 5 illustrates a process flow of an embodiment. In operation, transmitted control channel messages (e.g., control messages 410-430) contain chunk data representing at least a portion of the software and configuration data for a land mobile radio. At 510, a land mobile radio decodes a received control channel message containing chunk data 510. At 520, the land mobile radio determines whether or not it is interested in the chunk data based on the radio type indicated by the control channel message in, for example, a type header. If it is interested in the radio type, the land mobile radio next determines at 530 if the version of the software and configuration data is different from the one it may have. This may be accomplished, for example, by comparing versions numbers defined within the various fields of the received control channel message, such as the type header, major version 433, minor version 434, and so forth. For example, the software and configuration data may be of a newer or more current version than what the land mobile radio may have. Conversely, the land mobile radio may have the more current version. For either case, the land mobile radio may be upgraded, downgraded, or otherwise changed with the software and configuration of an embodiment so that each radio of a particular type will have a uniform configuration. Accordingly, a land mobile radio may change communications systems and upgrade, downgrade, or change in response to interact uniformly with each communications system.

If the chunk data represents at least a portion of a different software and configuration data, the land mobile radio may then determine the accuracy of the chunk data transmission with the chunk checksum at 540 (if included in the message). If the chunk checksum is not included in the message, then the land mobile radio may refer to a set of defined operational rules or parameters, such as requesting a resend of the message, omitting error checking and using the associated chunk data, discarding the associated chunk data, waiting for a resend of the chunk data with the chunk checksum, and so forth, as desired for a given implementation. If the chunk data is intact, the land mobile radio may download the chunk data to a data location based on the chunk offset at 550. Each time a chunk is stored, the land mobile radio may calculate the overall checksum of the stored chunks at 560. At 570, the land mobile radio may then compare the calculated checksum to the received overall transmission checksum included in the control channel message. If the calculated overall checksum and the received overall transmission checksum match, the land mobile radio will have an indication that it has received all of the chunks that collectively comprise the software and configuration data and it may use the stored chunk data at 590 to load, install, or otherwise implement the software and configuration data. If the checksums do not match, at 580 the land mobile radio may wait for the next chunk to arrive via another control channel message. This may continue until the entire software and configuration data is received, or update operations are canceled due to some termination event. Examples of termination event may be moving beyond transmission range, powering down the land mobile radio, exceeding memory resources, exceeding power constraints for the land mobile radio, user directed termination, communication channel characteristics (e.g., low signal-to-noise-ratio or high interference levels), and so forth. Partial software and configuration downloads may be stored by a land mobile radio for completion at a later time, or deleted from the system to conserve resources, as desired for a given implementation. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, also may mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, such as the examples given with reference to FIG. 2. For example, the memory unit may include any memory device, memory article, memory medium, storage device, storage article, storage medium and/or storage unit, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

What is claimed is:

1. A communication system comprising:
   a plurality of wireless communications devices, each wireless communications device having a respective software version and configuration and with at least some of the software versions and configurations being different from one another on different wireless communications devices;
   a given wireless communications device being configured to
      repeatedly wirelessly receive a plurality of broadcast control channel messages, each comprising a chunk data portion including broadcast software version data and broadcast configuration data, determine from each broadcast control channel message whether the broadcast software version data and broadcast configuration data matches the software version and configuration of the given wireless communications device, and perform a checksum operation on individual chunk data portions from matching control channel messages and an overall checksum operation on assembled chunk data portions.

2. The communication system of claim 1 wherein said given wireless communications device is further configured to:

receive a first broadcast control channel message of the plurality of broadcast control channel messages, the first broadcast control channel message including a first chunk data portion with a first portion of the broadcast software version data and broadcast configuration data; and store, based upon a first chunk offset, the first chunk data portion at a first location in the broadcast software version data and broadcast configuration data.

3. The communication system of claim 2 wherein said given wireless communications device is further configured to:

receive a second broadcast control channel message of the plurality of broadcast control channel messages, the second broadcast control channel message including a second chunk data portion with a second portion of the broadcast software version data and broadcast configuration data; and store, based upon a second chunk offset, the second chunk data portion at a second location in the broadcast software version data and broadcast configuration data.

4. The communication system of claim 3 wherein said given wireless communications device is configured to perform the overall checksum operation by at least:

calculating a checksum of a combination of the first and second data chunk portions; and comparing the checksum of the combination of the first and second data chunk portions to a general checksum for determining if the broadcast software version data and broadcast configuration data have been completely received.

5. The communication system of claim 1 wherein said given wireless communications device is further configured to execute matching broadcast software version data and broadcast configuration data so that substantially all wireless communications devices of a same type are configured uniformly.

6. The communication system of claim 1 wherein each broadcast control channel message includes a type header for indicating a wireless communications device type for a transmitter wireless communications device.

7. A wireless communications device comprising:

a processor; and a wireless transceiver cooperating therewith for communicating with a plurality of other wireless communications devices, each other wireless communications device having a respective software version and configuration and with at least some of the software versions and configurations being different from one another on different other wireless communications devices;

said wireless transceiver configured to repeatedly wirelessly receive a plurality of broadcast control channel messages, each comprising a chunk data portion including broadcast software version data and broadcast configuration data, determine from each broadcast control channel message whether the broadcast software version data and broadcast configuration data matches the software version and configuration of the wireless communications device, and perform a checksum operation on individual chunk data portions from matching control channel messages and an overall checksum operation on assembled chunk data portions.

8. The wireless communications device of claim 7 wherein said wireless transceiver is further configured to:

receive a first broadcast control channel message of the plurality of broadcast control channel messages, the first broadcast control channel message including a first chunk data portion with a first portion of the broadcast software version data and broadcast configuration data; and store, based upon a first chunk offset, the first chunk data portion at a first location in the broadcast software version data and broadcast configuration data.

9. The wireless communications device of claim 8 wherein said wireless transceiver is further configured to:

receive a second broadcast control channel message of the plurality of broadcast control channel messages, the second broadcast control channel message including a second chunk data portion with a second portion of the broadcast software version data and broadcast configuration data; and store, based upon a second chunk offset, the second chunk data portion at a second location in the broadcast software version data and broadcast configuration data.

10. The wireless communications device of claim 9 wherein said processor is configured to perform the overall checksum operation by at least:

calculating a checksum of a combination of the first and second data chunk portions; and comparing the checksum of the combination of the first and second data chunk portions to a general checksum for determining if the broadcast software version data and broadcast configuration data have been completely received.

11. The wireless communications device of claim 7 wherein said processor is configured to execute matching broadcast software version data and broadcast configuration data so that substantially all other wireless communications devices of a same type are configured uniformly.

12. The wireless communications device of claim 7 wherein each broadcast control channel message includes a type header for indicating a wireless communications device type for a transmitter wireless communications device.

13. A method of operating a communication system having a plurality of wireless communications devices, each wireless communications device having a respective software version and configuration and with at least some of the software versions and configurations being different from one another on different wireless communications devices, the method comprising:

repeatedly wirelessly receiving a plurality of broadcast control channel messages, each comprising a chunk data portion including broadcast software version data and broadcast configuration data;

determining from each broadcast control channel message whether the broadcast software version data and broadcast configuration data matches the software version and configuration of the given wireless communications device; and performing a checksum operation on individual chunk data portions from matching control channel messages and an overall checksum operation on assembled chunk data portions.

14. The method of claim 13 further comprising:
receiving a first broadcast control channel message of the plurality of broadcast control channel messages, the first broadcast control channel message including a first chunk data portion with a first portion of the broadcast software version data and broadcast configuration data; and
storing, based upon a first chunk offset, the first chunk data portion at a first location in the broadcast software version data and broadcast configuration data.

15. The method of claim 14 further comprising:
receiving a second broadcast control channel message of the plurality of broadcast control channel messages, the second broadcast control channel message including a second chunk data portion with a second portion of the broadcast software version data and broadcast configuration data; and
storing, based upon a second chunk offset, the second chunk data portion at a second location in the broadcast software version data and broadcast configuration data.

16. The method of claim 15 wherein the performing of the overall checksum operation comprises:
calculating a checksum of a combination of the first and second data chunk portions; and
comparing the checksum of the combination of the first and second data chunk portions to a general checksum for determining if the broadcast software version data and broadcast configuration data have been completely received.

17. The method of claim 13 further comprising executing matching broadcast software version data and broadcast configuration data so that substantially all wireless communications devices of a same type are configured uniformly.

18. The method of claim 13 wherein each broadcast control channel message includes a type header for indicating a wireless communications device type for a transmitter wireless communications device.

19. A non-transitory computer-readable medium having computer executable instructions for performing steps comprising:
communicating with a plurality of wireless communications devices, each wireless communications device having a respective software version and configuration and with at least some of the software versions and configurations being different from one another on different wireless communications devices;
repeatedly wirelessly receiving a plurality of broadcast control channel messages, each comprising a chunk data portion including broadcast software version data and broadcast configuration data;
determining from each broadcast control channel message whether the broadcast software version data and broadcast configuration data matches the software version and configuration of the given wireless communications device; and
performing a checksum operation on individual chunk data portions from matching control channel messages and an overall checksum operation on assembled chunk data portions.

20. The non-transitory computer-readable medium of claim 19 further performing the step of:
receiving a first broadcast control channel message of the plurality of broadcast control channel messages, the first broadcast control channel message including a first chunk data portion with a first portion of the broadcast software version data and broadcast configuration data; and
storing, based upon a first chunk offset, the first chunk data portion at a first location in the broadcast software version data and broadcast configuration data.

21. The non-transitory computer-readable medium of claim 20 further performing the step of:
receiving a second broadcast control channel message of the plurality of broadcast control channel messages, the second broadcast control channel message including a second chunk data portion with a second portion of the broadcast software version data and broadcast configuration data; and
storing, based upon a second chunk offset, the second chunk data portion at a second location in the broadcast software version data and broadcast configuration data.

22. The non-transitory computer-readable medium of claim 21 wherein the performing of the overall checksum operation comprises:
calculating a checksum of a combination of the first and second data chunk portions; and
comparing the checksum of the combination of the first and second data chunk portions to a general checksum for determining if the broadcast software version data and broadcast configuration data have been completely received.

23. The non-transitory computer-readable medium of claim 19 further performing the step of executing matching broadcast software version data and broadcast configuration data so that substantially all wireless communications devices of a same type are configured uniformly.

24. The non-transitory computer-readable medium of claim 19 wherein each broadcast control channel message includes a type header for indicating a wireless communications device type for a transmitter wireless communications device.

* * * * *